United States Patent
Sato et al.

(10) Patent No.: US 8,651,648 B2
(45) Date of Patent: Feb. 18, 2014

(54) TREATMENT SOLUTION FOR INKJET TEXTILE PRINTING, METHOD FOR INKJET TEXTILE PRINTING, AND INKJET TEXTILE PRINTED PRODUCT

(75) Inventors: Yoichi Sato, Osaka (JP); Masakazu Ohashi, Osaka (JP)

(73) Assignee: Sakata Inx Corp., Osaka (JP)

( * ) Notice: Subject to any disclaimer, the term of this patent is extended or adjusted under 35 U.S.C. 154(b) by 606 days.

(21) Appl. No.: 12/810,761

(22) PCT Filed: Dec. 25, 2008

(86) PCT No.: PCT/JP2008/073643
§ 371 (c)(1),
(2), (4) Date: Dec. 28, 2010

(87) PCT Pub. No.: WO2009/084600
PCT Pub. Date: Jul. 9, 2009

(65) Prior Publication Data
US 2011/0102497 A1    May 5, 2011

(30) Foreign Application Priority Data

Dec. 28, 2007    (JP) .................................. 2007-340659

(51) Int. Cl.
*B41J 2/01*    (2006.01)
(52) U.S. Cl.
USPC ................... 347/96; 347/95; 347/98; 347/100
(58) Field of Classification Search
USPC ................ 347/21, 28, 95–100; 523/160, 161; 106/31.16, 31.27, 31.6, 31.13
See application file for complete search history.

(56) References Cited

U.S. PATENT DOCUMENTS

| | | | | |
|---|---|---|---|---|
| 6,084,619 A | * | 7/2000 | Takemoto et al. | 347/96 |
| 6,086,197 A | * | 7/2000 | Kubota et al. | 347/96 |
| 6,286,953 B1 | * | 9/2001 | Takemoto et al. | 347/100 |
| 2006/0173096 A1 | * | 8/2006 | Ota | 523/161 |
| 2007/0197685 A1 | * | 8/2007 | Aruga et al. | 523/160 |

FOREIGN PATENT DOCUMENTS

| | | |
|---|---|---|
| JP | 7-119047 | 5/1995 |
| JP | 2000-226781 | 8/2000 |
| JP | 2001-098473 | 4/2001 |
| JP | 2005-320656 | 11/2005 |
| JP | 2006-124843 | 5/2006 |
| JP | 2006-152454 | 6/2006 |
| JP | 2008-266853 | 11/2008 |

* cited by examiner

*Primary Examiner* — Matthew Luu
*Assistant Examiner* — Rut Patel
(74) *Attorney, Agent, or Firm* — Hamre, Schumann, Mueller & Larson, P.C.

(57) ABSTRACT

The present invention has its object to provide a treatment solution for inkjet textile printing that causes few remaining marks even when applied to a fabric. The present invention relates to a treatment solution for inkjet textile printing, the treatment solution including at least: 1) a water-soluble polyvalent metal salt; 2) at least one resin component selected from the group consisting of a nonionic resin emulsion, an anionic resin emulsion, and a carboxymethyl cellulose; 3) at least one surfactant component selected from the group consisting of a nonionic surfactant, an anionic surfactant, and an amphoteric surfactant; and 4) an aqueous medium, the treatment solution being applied to a fabric before printing of an ink composition for inkjet textile printing.

8 Claims, No Drawings

TREATMENT SOLUTION FOR INKJET TEXTILE PRINTING, METHOD FOR INKJET TEXTILE PRINTING, AND INKJET TEXTILE PRINTED PRODUCT

TECHNICAL FIELD

The present invention relates to a treatment solution for inkjet textile printing that causes few remaining marks even when applied to a fabric; a method for inkjet textile printing and, which uses the treatment solution for inkjet textile printing, which does not impair the drape of the fabric in the printed part, which achieves a high image density (image density, degree of whiteness, image sharpness), and which is excellent in the durability and washing fastness of an ink coat; and an inkjet textile printed product obtainable by the method for inkjet textile printing.

BACKGROUND ART

As conventional methods for printing on a fabric, handwriting and screen printing methods have been mainly employed. Presently, inkjet recording methods are more often employed because they enable very simple continuous dyeing even on a long fabric. In addition, water-based inks containing pigments as coloring agents attract more attention as inks for printing. This is because the conventional inks containing dyes as coloring agents give clear images and have a broader reproducible color gamut, but have lower light resistance. Further, such conventional inks require complicated post processes such as fixing of inks on fabrics, rinsing of fabrics, and waste solution disposal.

In addition to a method including printing the water-based ink with pigments on a white fabric, the following method is mainly performed which includes removing beforehand the color of a fabric dyed in a deep color with a discharging agent at a portion where inks are to be printed, and thereafter printing the water-based inks with pigments. Here, in the latter method for inkjet textile printing, the color of the fabric itself with the pigments removed therefrom is regarded as white. Accordingly, when the inks are printed on the portion with its color removed therefrom, the clearness of images is problematically insufficient.

To solve the problem, the following method is proposed in which a fabric treated with a treatment solution that contains a cationic compound such as a water-soluble polyvalent metal ion and a cationic resin is dyed white at a portion where inks are to be printed with a white-pigment water-based ink without discharging coloring matter even in the case of a fabric with a deep color, and thus the image printed on the fabric is clearly sharpened (see, for example, Patent Documents 1 to 4). Disadvantageously, these methods do not give a sufficient degree of whiteness, and properties such as the drape of a fabric, the durability of an ink coat, and washing fastness are also still insufficient.

In the case that a conventional treatment solution is used, problematically, remaining marks (remaining marks indicate treatment solution-derived white marks remain in non-printed areas on the treatment agent-coated surface of a textile printed product) appear on a fabric.

Patent Document 1: Japanese Kokai Publication H7-119047
Patent Document 2: Japanese Kokai Publication 2000-226781
Patent Document 3: Japanese Kokai Publication 2001-098473
Patent Document 4: Japanese Kokai Publication 2005-320656

DISCLOSURE OF THE INVENTION

Problems to be Solved by the Invention

An object of the present invention is a treatment solution for inkjet textile printing that causes few remaining marks even when applied to a fabric; and a method for inkjet textile printing, which uses the treatment solution for inkjet textile printing, which does not impair the drape of the fabric in the printed part, which achieves a high image density (image density, degree of whiteness, image sharpness), and which is excellent in the durability and washing fastness of an ink coat; and an inkjet textile printed product obtainable by the method for inkjet textile printing.

Means for Solving the Problems

As a result of earnest investigations to solve the above problems, the present inventors propose a method including applying, to a fabric, a treatment solution that contains a water-soluble polyvalent metal salt, a nonionic resin emulsion having a glass transition temperature of 0° C. or lower, and an aqueous medium, and dyeing the fabric with a white-pigment water-based ink containing a resin emulsion (see, for example, Japanese Kokai Publication 2008-266853). The dyeing method previously proposed by the present inventors improves properties such as the drape of a fabric, the durability of an ink coat, and washing fastness. However, the problem that remaining marks appear on a fabric is not sufficiently solved in some cases.

As a result of further earnest investigations, the present inventors have found that the above problem is solved by the following method and completed the present invention. The method comprises:

a pre-treatment with a treatment solution comprising at least: a water-soluble polyvalent metal salt; at least one resin component selected from the group consisting of a nonionic resin emulsion, an anionic resin emulsion, and a carboxymethyl cellulose; and at least one surfactant component selected from the group consisting of a nonionic surfactant, an anionic surfactant, and an amphoteric surfactant; and an aqueous medium;

printing (1) as a white ink composition for inkjet textile printing, a white ink composition for inkjet textile printing containing a white pigment, a polymeric dispersant obtainable by neutralizing an anionic water-soluble resin with a basic compound, a nonionic resin emulsion having a glass transition temperature of 20° C. or lower and/or an anionic resin emulsion having a glass transition temperature of 0° C. or lower, and an aqueous medium, and/or (2) as a non-white ink composition for inkjet textile printing, a non-white ink composition for inkjet textile printing containing a non-white pigment, a polymeric dispersant obtainable by neutralization of an anionic water-soluble resin with a basic compound, a nonionic resin emulsion having a glass transition temperature of 0° C. or lower and/or an anionic resin emulsion having a glass transition temperature of 0° C. or lower, and an aqueous medium; and heating the printed fabric.

In the case of printing the non-white ink composition for inkjet textile printing, the step of printing the white ink composition for inkjet textile printing is desirably followed by the step of printing the non-white ink composition for inkjet textile printing and the step of heating the printed fabric.

That is, the present invention relates to (1) a treatment solution for inkjet textile printing, comprising at least: 1) a water-soluble polyvalent metal salt; 2) at least one resin component selected from the group consisting of a nonionic resin emulsion, an anionic resin emulsion, and a carboxymethyl cellulose; 3) at least one surfactant component selected from the group consisting of a nonionic surfactant, an anionic surfactant, and an amphoteric surfactant; and 4) an aqueous medium, the solution being applied to a fabric before printing of an ink composition for inkjet textile printing.

The present invention also relates to (2) the treatment solution for inkjet textile printing according to (1), wherein the water-soluble polyvalent metal salt is a calcium salt.

The present invention also relates to (3) the treatment solution for inkjet textile printing according to (2), wherein the calcium salt has hygroscopicity.

The present invention also relates to (4) the treatment solution for inkjet textile printing according to any one of (1) to (3), wherein the amount of the surfactant component is 0.1 to 1.5% by mass in the treatment solution for inkjet textile printing.

The present invention also relates to (5) the treatment solution for inkjet textile printing according to any one of (1) to (4), wherein the nonionic surfactant has an HLB value of 13 or higher.

The present invention also relates to (6) the treatment solution for inkjet textile printing according to any one of claims 1 to 5, which satisfies formula (1):

$$0.1 \leq (A/3 + B/3 + C) \leq 1.7 \quad (1)$$

wherein A represents the solid content of the nonionic resin emulsion in parts by mass; B represents the solid content of the anionic resin emulsion in parts by mass; and C represents the solid content of the carboxymethyl cellulose in parts by mass, in 100 parts by mass of the treatment solution for inkjet textile printing, and A, B, and C each may be 0 parts by mass as long as the condition of formula (1) is satisfied.

The present invention also relates to (7) a method for inkjet textile printing, comprising the steps of: providing the treatment solution for inkjet textile printing according to any one of (1) to (6) in at least a printing region for inkjet ink on a fabric; heating the fabric with the treatment solution provided thereon; printing, on the region with the treatment solution provided thereon, the following ink compositions (1) and/or (2): (1) a white ink composition for inkjet textile printing comprising a white pigment, a polymeric dispersant obtainable by neutralizing an anionic water-soluble resin with a basic compound, a nonionic resin emulsion having a glass transition temperature of 20° C. or lower and/or an anionic resin emulsion having a glass transition temperature of 0° C. or lower, and an aqueous medium; (2) a non-white ink composition for inkjet textile printing comprising a non-white pigment, a polymeric dispersant obtainable by neutralizing an anionic water-soluble resin with a basic compound, a nonionic resin emulsion having a glass transition temperature of 0° C. or lower and/or an anionic resin emulsion having a glass transition temperature of 0° C. or lower, and an aqueous medium; and heating the printed fabric.

The present invention also relates to (8) the method for inkjet textile printing according to (7), wherein the step of printing the white ink composition for inkjet textile printing is followed by the step of printing a non-white ink composition for inkjet textile printing.

The present invention also relates to (9) an inkjet textile printed product obtainable by the method for inkjet textile printing according to (7) or (8).

In the present description, the glass transition temperature, the acid value, the weight-average molecular weight, and the HLB value are measured as follows
(Glass Transition Temperature (Tg))

The glass transition temperature is a theoretical glass transition temperature obtained by the following formula of Wood.

Formula of Wood: $1/Tg = W1/Tg1 + W2/Tg2 + W3/Tg3 + \ldots + Wx/Tgx$

In the formula, Tg1 to Tgx each represent a glass transition temperature of a homopolymer of each monomer 1, 2, 3 . . . x that form a copolymer, W1 to Wx each represent a mass fraction of monomers 1, 2, 3 . . . x, and Tg represents a theoretical glass transition temperature. Here, the glass transition temperature in the formula of Wood is expressed in absolute temperature.
(Acid Value)

The acid value is a theoretical acid value determined from the composition of each copolymer.
(Weight-Average Molecular Weight)

The weight-average molecular weight is measured by a gel permeation chromatography (GPC). For example, the chromatography is performed with Water 2690 (produced by Waters Corporation) as a GPC apparatus and PLgel 5μ MIXED-D (produced by Polymer Laboratories Ltd.) as a column, and thereby the weight-average molecular weight is measured on polystyrene conversion.
(HLB Value)

The HLB value is calculated based on the following formula.

$$HLB\ value = 20 \times (Mw/M)$$

(Mw: weight of hydrophilic group portion, M: molecular weight of surfactant)

DETAILED DESCRIPTION OF THE INVENTION

Hereinafter, the present invention will be described in further detail.
<Treatment Solution for Inkjet Textile Printing>

First, the treatment solution for inkjet textile printing according to the present invention will be described.

Usable as a treatment solution for inkjet textile printing is a treatment solution for inkjet textile printing that contains a water-soluble polyvalent metal salt; at least one resin component selected from the group consisting of a nonionic resin emulsion, an anionic resin emulsion, and a carboxymethyl cellulose; at least one surfactant component selected from the group consisting of a nonionic surfactant, an anionic surfactant, and an amphoteric surfactant; and an aqueous medium.

Usable as the water-soluble polyvalent metal salt are known compounds in the field of treatment solutions for inkjet textile printing. Examples thereof include dissociative salts of alkaline-earth metals such as Ca, Mg, and Ba. Typical examples of such a compound include calcium nitrate, $CaCl_2$, $Ca(OH)_2$, $(CH_3COO)_2Ca$, $MgCl_2$, $Mg(OH)_2$, $(CH_3CH_3COO)_2Mg$, and $BaCl_2$. Calcium salts are desirable among these. Calcium salts such as calcium nitrate, which are colorless crystals and have hygroscopicity, are particularly desirable in terms of deposition of salts on a fabric after the treatment solution-coated surface is dried.

The amount of the water-soluble polyvalent metal salt in the treatment solution is not particularly limited. For example, the treatment solution may contain an amount of the water-soluble polyvalent metal salt of about 2 to 20% by mass.

Usable as the resin component is at least one resin component selected from the group consisting of a nonionic resin emulsion, an anionic resin emulsion, and a carboxymethyl cellulose. Use of such a resin component, a water-soluble polyvalent metal salt having hygroscopicity, and the below-mentioned nonionic surfactant mentioned above as the components of the treatment solution prevents remaining marks on a fabric desirably. In the case that the treatment solution is provided on a fabric and an inkjet ink is printed on the fabric, a textile printed product excellent in drape of a fabric, image density, durability of an ink coat and washing fastness is provided.

A nonionic resin emulsion and an anionic resin emulsion are desirable among the resin components.

Examples of the nonionic resin emulsion and the anionic resin emulsion include acrylic resin, methacrylic resin, styrene resin, styrene-acrylic resin (a styrene-acrylate copolymer, a styrene-acrylate-alkylester acrylate copolymer, a styrene-maleate copolymer, a styrene-maleate-alkylester acrylate copolymer, a styrene-methacrylate copolymer, a styrene-methacrylate-alkylester acrylate copolymer, a styrene-maleate-half ester copolymer, and the like copolymers), urethane resin, polyester resin, olefin resin, vinyl acetate resin, acrylamide resin, and epoxy resin. Desirable among these are acrylic resin, methacrylic resin, styrene resin, and styrene-acrylic resin. These may be used independently, or two or more kinds may be used in combination. When higher water resistance and washing fastness are required, thermally crosslinkable components are desirably introduced into these emulsions as long as they do not lower the drape.

The glass transition temperatures of the nonionic resin emulsion and the anionic resin emulsion are desirably 20° C. or lower in order to achieve good drape of a fabric. If the total resin amount of the resin emulsion in the treatment solution exceeds 3% by mass, the glass transition temperatures of the nonionic resin emulsion and the anionic resin emulsion are desirably 0° C. or lower. If the total resin amount of the resin emulsion in the treatment solution exceeds 3% by mass and the glass transition temperature of the resin emulsion is larger than 0° C., the drape of a fabric tends to be deteriorated.

As the carboxymethyl cellulose, known ones in the field of inkjet ink may be used. Ones having a small molecular weight are desirable in order to prevent remaining marks and to achieve good drape.

With respect to the amount of the resin component, materials are desirably blended so as to satisfy formula (1):

$$0.1 \leq (A/3 + B/3 + C) \leq 1.7 \quad (1)$$

wherein A represents the solid content of the nonionic resin emulsion in parts by mass; B represents the solid content of the anionic resin emulsion in parts by mass; and C represents the solid content of the carboxymethyl cellulose in parts by mass, in 100 parts by mass of the treatment solution for inkjet textile printing, and A, B, and C each may be 0 parts by mass as long as the condition of formula (1) is satisfied.

If the amount is small, the degree of whiteness and washing fastness may be less improved. If the amount is outside the range, the drape of a fabric may be deteriorated.

Next, surfactant components will be described.

The surfactant component to be included in the treatment solution for inkjet textile printing according to the present invention is at least one selected from the group consisting of a nonionic surfactant, an anionic surfactant, and an amphoteric surfactant.

The nonionic surfactants are free from an ionic group as a polar group. Examples thereof include acetylene glycol surfactants such as ethylene oxide and/or propylene oxide adducts of acetylene glycol (specifically, ethylene oxide and/or propylene oxide adducts such as 2,4,7,9-tetramethyl-5-decyne-4,7,-diol and 3,6-dimethyl-4-octyne-3,6-diol); acetylene alcohol surfactants such as ethylene oxide and/or propylene oxide adducts of acetylene alcohol (specifically, ethylene oxide and/or propylene oxide adducts such as 3,5-dimethyl-1-hexan-3-ol); ethers such as polyoxyethylene nonylphenyl ether, polyoxyethylene octylphenyl ether, polyoxyethylene dodecylphenyl ether, polyoxyethylene alkylaryl ethers, polyoxyethylene oleyl ether, polyoxyethylene lauryl ether, polyoxyethylene alkyl ethers, and polyoxyalkylene alkyl ethers; esters such as polyoxyethylene oleic acid, polyoxyethylene oleate, polyoxyethylenedistearate, sorbitanlaurate, sorbitan monostearate, sorbitan monooleate, sorbitansesquiolate, polyoxyethylene monooleate, and polyoxyethylene stearate; polyether-modified siloxane surfactants such as dimethylpolysiloxane; and fluorine-containing surfactants such as fluorine alkyl esters and perfluoroalkyl carboxylates.

The anionic surfactant has an anionic moiety in a molecule, and examples thereof include polyoxy ethyl alkyl ether sulfates, and polyoxyethylene alkyl phenyl ether sulfates.

The amphoteric surfactant has a cationic moiety and an anionic moiety, and examples thereof include carboxy betaine type surfactants such as 2-alkyl-N-carboxymethyl-N-hydroxyethyl-imidaliniumbetaine and aminocarboxylates.

As the surfactant component, a nonionic surfactant is desirable among these from the viewpoint of long-term stability of the treatment solution for inkjet textile printing according to the present invention. As such a nonionic surfactant, a nonionic surfactant having an HLB value of 13 or higher is desirable, and ethylene oxide adducts of polyoxyethylene alkyl ether and acetylene glycol are particularly desirable.

The amount of the surfactant component in the treatment solution for inkjet textile printing is desirably 0.1 to 1.5% by mass. If the amount is smaller than 0.1% by mass, the treatment solution may not be uniformly provided on a fabric. Thus, uneven printing may occur. An amount larger than 1.5% by mass may deteriorate the washing fastness.

The aqueous medium is not particularly limited. Examples thereof include water conventionally used in a treatment solution for inkjet textile printing, and a mixture of water and a water-miscible solvent. Specific examples of the water-miscible solvent include lower alcohols such as ethanol and propanol; polyhydric alcohols such as glycerin; (poly)alkylene glycols such as (poly)ethylene glycol and (poly)propylene glycol; and alkyl ethers thereof. These may be used independently, or two or more kinds thereof may be used in combination.

The treatment solution of the present invention may contain a water-soluble polymer which is conventionally used in the treatment solution for inkjet textile printing as long as it does not deteriorate the performance.

Examples of the water-soluble polymer include known natural water-soluble polymers such as polysaccharides e.g. starch substances derived from corn and wheat, gum arabic, locust bean gum, tragacanth gum, guar gum, and a tamarind seed; protein substances such as gelatin and casein; tannin substances; and lignin substances. Examples of the water-soluble polymer further include synthetic polymers such as known polyvinyl alcohol compounds and polyethylene oxide compounds.

The treatment solution of the present invention is produced by stirring the water-soluble polyvalent metal salt, the resin components (such as nonionic resin emulsion), the nonionic surfactant, if necessary the water-soluble polymer and the aqueous medium with conventional means.

<Method for Inkjet Textile Printing>

Next, the method for inkjet textile printing will be described.

One example of the method for inkjet textile printing comprises the steps of: providing the treatment solution for inkjet textile printing in at least a printing region for inkjet ink on a fabric; heating the fabric with the treatment solution provided thereon; printing, on the region with the treatment solution provided thereon, the following ink compositions (1) and/or (2): (1) a white ink composition for inkjet textile printing comprising a white pigment, a polymeric dispersant obtainable by neutralizing an anionic water-soluble resin with a basic compound, a nonionic resin emulsion having a glass transition temperature of 20° C. or lower and/or an anionic resin emulsion having a glass transition temperature of 0° C. or lower, and an aqueous medium; (2) a non-white ink composition for inkjet textile printing comprising a non-white pigment, a polymeric dispersant obtainable by neutralizing an anionic water-soluble resin with a basic compound, a nonionic resin emulsion having a glass transition temperature of 0° C. or lower and/or an anionic resin emulsion having a glass transition temperature of 0° C. or lower, and an aqueous medium; and heating the printed fabric. In the case of printing a non-white ink composition for inkjet textile printing, the step of printing the white ink composition for inkjet textile printing is desirably followed by the step of printing a non-white ink composition for inkjet textile printing and the step of heating the printed fabric.

(Material Used in Method for Inkjet Textile Printing)

[Fabric]

Any fabric conventionally used is available as a fabric. Examples thereof include fabrics made of cotton, silk, linen, rayon, acetate, nylon, or polyester fiber, and blended fabrics of two or more kinds of these fibers.

[Treatment Solution for Inkjet Textile Printing]

Usable as the treatment solution for inkjet textile printing are those described above.

[Ink Composition for Inkjet Textile Printing]

Examples of the ink composition for inkjet textile printing include those conventionally used. Desirable examples thereof include an ink composition that contains a pigment, a polymeric dispersant, a nonionic resin emulsion and/or an anionic resin emulsion, and an aqueous medium.

[White Ink Composition for Inkjet Textile Printing (Components and Production Process)]

Usable as the white ink composition for inkjet textile printing is a white ink composition that contains a white pigment as a coloring component; a polymeric dispersant obtainable by neutralizing an anionic water-soluble resin with a basic compound; a nonionic resin emulsion and/or an anionic resin emulsion; and an aqueous medium.

Examples of the white pigment include white pigments having high shielding properties such as titanium dioxide and zinc oxide. In particular, titanium dioxide is desirable as the white pigment because it provides a high light blocking effect. Desirable examples of the titanium dioxide include various titanium dioxides such as rutile type and anatase type ones which are conventionally used in inks for inkjet textile printing and have an average particle diameter of 0.21 to 0.28 μm and an oil absorption of 15 to 33. The surfaces of these titanium dioxides are coated with a surface-treating agent at an alumina/silica ratio (mass ratio) of 100/0 to 33.3/66.7. The oil absorption used herein is specified in JIS K5101.

The amount of the pigment is desirably 10 to 30% by mass in the ink composition for inkjet textile printing.

Usable as the polymeric dispersant is a polymeric dispersant obtainable by neutralizing an anionic water-soluble resin with a basic compound. It is desirably a polymeric dispersant obtainable by neutralizing an anionic water-soluble resin having a glass transition temperature of 0 to 80° C. with a basic compound.

Examples of the anionic water-soluble resin include a copolymer obtainable by reacting a mixture containing one or more carboxyl group-containing unsaturated monomer species (including an acid anhydride group-containing unsaturated monomer that gives a carboxyl group by ring opening) and one or more unsaturated monomer species. Examples of the carboxyl group-containing unsaturated monomers include acrylic acid, methacrylic acid, itaconic acid, maleic acid, maleic anhydride, maleic acid monoalkyl ester, citraconic acid, citraconic anhydride, and citraconic acid monoalkyl ester. The unsaturated monomers are selected from the group consisting of styrene monomers such as styrene, α-methylstyrene, and vinyltoluene, aralkyl methacrylates or aralkyl acrylates such as benzyl methacrylate and benzyl acrylate, and alkyl methacrylates or alkyl acrylates such as methyl methacrylate, butyl methacrylate, 2-ethylhexyl methacrylate, stearyl methacrylate, lauryl methacrylate, methyl acrylate, butyl acrylate, 2-ethylhexyl acrylate, stearylacrylate, and laurylacrylate. Desirable examples of the anionic water-soluble resin include a copolymer obtainable by reacting a mixture of monomers selected so as to have a glass transition temperature of 0 to 80° C.

Specific examples of the anionic water-soluble resin include a (meth)acrylic acid alkyl ester-(meth)acrylic acid copolymer, a styrene-(meth)acrylic acid copolymer, a styrene (meth)acrylic acid-(meth)acrylic acid alkyl ester copolymer, a styrene-maleic acid (meth) acrylic acid alkyl ester copolymer, a styrene-maleic acid half ester copolymer, a styrene-maleic acid half ester-(meth)acrylic acid alkyl ester copolymer, and a styrene-(meth)acrylic acid-(meth)acrylic acid alkyl ester-benzyl (meth)acrylate copolymer.

If the glass transition temperature of the anionic water-soluble resin is lower than 0° C., dispersed pigment particles are more likely to fuse together, likely resulting in reduction in storage stability and discharge stability. A glass transition temperature exceeding 80° C. may deteriorate the drape of the textile printed product.

Of these anionic water-soluble resins, those having an acid value of 100 to 300 mg KOH/g are desirable in terms of good solubility to an aqueous medium and water resistance of the dyed product, and those having a weight-average molecular weight of 5000 to 30000 are desirable in terms of good pigment dispersibility and pigment dispersion stability of a white pigment.

Examples of the basic compound include alkali metal hydroxides such as sodium hydroxide and potassium hydroxide; and organic basic compounds such as triethylamine, monoethanolamine, triethanolamine, and triethylenediamine. These may be used independently, or two or more of these may be used in combination.

The amount of the polymeric dispersant is desirably 10 to 40 parts by mass, and more desirably 15 to 30 parts by mass, with respect to 100 parts by mass of the white pigment. An amount of the polymeric dispersant of less than 10 parts by mass may deteriorate pigment dispersibility to an aqueous medium. An amount exceeding 40 parts by mass may increase the viscosity. Accordingly, the amounts of the nonionic resin emulsion, anionic resin emulsion to be mentioned later, and the aqueous medium to be mentioned later are restricted, likely resulting in deterioration of washing fastness and discharge stability.

In the white ink composition, a nonionic resin emulsion having a glass transition temperature of 20° C. or lower and an anionic resin emulsion having a glass transition temperature of 0° C. or lower may be used. If the glass transition temperature of the nonionic resin emulsion is higher than 20° C., or if the glass transition temperature of the anionic resin emulsion is higher than 0° C., the drape of a fabric may be deteriorated.

The amounts (mass ratio) of the nonionic resin emulsion and anionic resin emulsion to the polymeric dispersant desirably satisfy the ranges of formulae (2) to (4).

Here, the amounts of the nonionic resin emulsion and the anionic resin emulsion are not simultaneously zero.

$$(\text{Polymeric dispersant}):[(\text{nonionic resin emulsion})+(\text{anionic resin emulsion})]=1:3 \text{ to } 1:10 \quad (2)$$

$$(\text{Nonionic resin emulsion})/(\text{polymeric dispersant}) \leq 8 \quad (3)$$

$$(\text{Anionic resin emulsion})/(\text{polymeric dispersant}) \leq 12 \quad (4)$$

In the white ink composition, if the total amount of the nonionic resin emulsion and the anionic resin emulsion is less than 3 times that of the polymeric dispersant, sufficient washing fastness is not achieved. If the total amount is more than 10 times, the concentration of the pigment is insufficient due to the restriction of ink viscosity, or the pigment is insufficiently agglomerated and deposited in the treatment solution. Accordingly, a high image density is less likely to be provided.

Examples of such a nonionic resin emulsion and an anionic resin emulsion include the nonionic resin emulsion and anionic resin emulsion mentioned above as the components of the treatment solution. In the case where higher water resistance and washing fastness are required, these emulsions desirably contain a thermally crosslinkable component as long as it does not deteriorate the drape.

In the white ink composition, the aqueous medium is not particularly limited. The aqueous medium mentioned above as the component of the treatment solution may be used.

The total solid content of the white pigment, the polymeric dispersant, the nonionic resin emulsion, and the anionic resin emulsion is desirably 25 to 45% by mass in the white ink composition for inkjet textile printing. A total solid content of less than 25% by mass tends to deteriorate the printing density of the matter printed on a fabric. A total solid content exceeding 45% by mass tends to increase the viscosity and deteriorate the discharge stability.

In order to secure favorable discharge stability, the white ink composition desirably contains a surfactant. Examples of the surfactant include an anionic surfactant and a nonionic surfactant.

The amount of the surfactant is desirably 0.1 to 2.0% by mass in the white ink composition. An amount of smaller than 0.1% by mass may not give sufficient surface activity (may not sufficiently lower the surface tension). An amount of larger than 2.0% by mass may deteriorate the discharge stability.

The surfactant is desirably a nonionic surfactant because the nonionic surfactant provides an ink composition with good discharge stability and little foaming. Specifically, the nonionic surfactant mentioned above as the component of the treatment solution may be used.

The white ink composition may contain various additives such as viscosity modifiers, antifoaming agents, and film formation auxiliaries if necessary.

The viscosity of the white ink composition for inkjet textile printing is desirably 5 to 20 mPa·s.

The white ink composition for inkjet textile printing according to the present invention may be produced by a conventional method. Examples of the method include a method in which a white ink composition for inkjet textile printing is produced by the steps of: mixing a white pigment, a polymeric dispersant, and an aqueous medium (and if necessary, a surfactant, a viscosity modifier, an antifoaming agent, and the like agents); dispersing the resultant mixture with any disperser and stirrer (for example, a bead mill, a ball mill, a sand mill, an attritor, a roll mill, an agitator, a Henschel mixer, a colloid mill, an ultrasonic homogenizer, an ultra-high pressure homogenizer, and a pearl mill); and adding the other materials such as nonionic resin emulsions and/or anionic resin emulsions to the dispersed mixture and mixing the entire mixture.

[Non-White Ink Composition for Inkjet Textile Printing (Components and Production Process)]

Examples of the non-white ink composition for inkjet textile printing include ink compositions that contain non-white color pigments as a coloring component; a polymeric dispersant obtainable by neutralizing an anionic water-soluble resin with a basic compound; a nonionic resin emulsion and/or an anionic resin emulsion; and an aqueous medium.

As the non-white color pigments, carbon black as a black pigment, non-white organic pigments, and the like pigments may be used. Examples of the non-white organic pigments include azo pigments such as azo lakes, insoluble azo pigments, condensed azo pigments, and chelate azo pigments; polycyclic pigments such as a phthalocyanine pigment, a perylene pigment, an anthraquinone pigment, a quinacridone pigment, a dioxazine pigment, a thioindigo pigment, an isoindolinone pigment, and a quinophthalone pigment; dye lakes such as a basic reactive lake and an acid dye lake; and nitro pigments. Specific examples thereof include red pigments such as C. I. Pigment Red 2, 3, 5, 16, 23, 31, 49, 57, 63, 122, and 123; blue pigments such as C. I. Pigment Blue 1, 2, 15:3, 16, and 17; and yellow pigments such as C. I. Pigment Yellow 3, 4, 5, 7, 17, 50, 51, 74, 81, 98, 105, and 180. These pigments achieve expression of vivid hues. In the non-white ink composition for inkjet textile printing, the amount of the non-white color pigments is desirably 10 to 30% by mass.

In the non-white ink composition for inkjet textile printing, the polymeric dispersant may be obtainable by neutralizing, with a basic compound, an anionic water-soluble resin having a weight-average molecular weight of 5000 to 30000 may be used as the polymeric dispersant. The anionic water-soluble resin desirably has a glass transition temperature of 40 to 90° C. and an acid value of 100 to 300 mg KOH/g. Examples of the anionic water-soluble resin include a copolymer which is obtainable by reaction of the monomer species mentioned as the components of the anionic water-soluble resin of the white ink composition and which has a glass transition temperature, an acid value, and a weight-average molecular weight each in the above range. Specific examples of this copolymer also include the copolymer mentioned as the component of the white ink composition.

The anionic water-soluble resin in the non-white ink composition for inkjet textile printing more desirably has a glass transition temperature of 50 to 90° C., an acid value of 130 to 240 mg KOH/g, and a weight-average molecular weight of 8000 to 20000.

An acid value of the anionic water-soluble resin of less than 100 mg KOH/g may lower the solubility of resin in an aqueous medium, and the acid value exceeding 300 mg KOH/g may deteriorate the water resistance of the matter printed on the fabric. If the glass transition temperature of the anionic water-soluble resin is lower than 40° C., dispersed pigment particles may agglomerate to deteriorate storage stability and discharge stability. A glass transition temperature exceeding 90° C. may deteriorate the drape of the textile printed product.

A weight-average molecular weight of the anionic water-soluble resin of less than 5000 may deteriorate the pigment dispersion stability, and a weight-average molecular weight exceeding 30000 may deteriorate the pigment dispersibility in an aqueous medium.

The basic compound mentioned above as the component of the polymeric dispersant of the white ink composition may be used as the basic compound.

The amount of the polymeric dispersant is desirably 10 to 40 parts by mass, and more desirably 15 to 30 parts by mass, with respect to 100 parts by mass of the non-white color pigments. An amount of the polymeric dispersant of less than 10 parts by mass may deteriorate pigment dispersibility to an aqueous medium. An amount exceeding 40 parts by mass may increase the viscosity. Accordingly, the amounts of the anionic resin emulsion, nonionic resin emulsion, and aqueous medium are restricted, likely resulting in deterioration of washing fastness and discharge stability.

In the non-white ink composition for inkjet textile printing, a nonionic resin emulsion having a glass transition temperature of 0° C. or lower and/or an anionic resin emulsion having a glass transition temperature of 0° C. or lower may be used. A glass transition temperature of the resin emulsion of higher than 0° C. may deteriorate the drape of a fabric.

In the non-white ink composition for inkjet textile printing, the amounts (solid content mass ratio) of the anionic resin emulsion and nonionic resin emulsion to the non-white color pigments desirably satisfy the range of formula (5). Here, the amounts of the anionic resin emulsion and the nonionic resin emulsion are not simultaneously zero.

(Non-white color pigments):[(anionic resin emulsion)+(nonionic resin emulsion)]=1:3 to 1:6     (5)

In the non-white ink composition, if the total amount (solid mass ratio) of the anionic resin emulsion and the nonionic resin emulsion is less than 3 times that of the non-white color pigments, sufficient washing fastness is not achieved. If the total amount is more than 6 times, the concentration of the pigment is insufficient due to the restriction of ink viscosity and formulation window, or the total solid content in ink is high. Accordingly, discharge stability is less likely to be provided.

Examples of such an anionic resin emulsion and a nonionic resin emulsion include the anionic resin emulsion and nonionic resin emulsion mentioned above as the components of the treatment solution. In the case where higher water resistance and washing fastness are required, these emulsions desirably contain a thermally crosslinkable component as long as it does not deteriorate the drape.

In order to secure favorable discharge stability, the non-white ink composition for inkjet textile printing desirably contains a surfactant. The surfactant may be an anionic surfactant and a nonionic surfactant.

The amount of the surfactant is desirably 0.1 to 2.0% by mass in the ink composition. An amount of smaller than 0.1% by mass may not give sufficient surface activity (may not sufficiently lower the surface tension). An amount larger than 2.0% by mass may deteriorate the discharge stability.

The surfactant is desirably the nonionic surfactant because it provides an ink composition with good discharge stability and little foaming. Specifically, the nonionic surfactant mentioned above as the component of the treatment solution may be used.

In the non-white ink composition for inkjet textile printing, the aqueous medium is not particularly limited. The aqueous medium mentioned above as the component of the treatment solution may be used.

The total solid content of the non-white color pigments, the polymeric dispersant, and the resin emulsion is desirably 10 to 35% by mass in the non-white ink composition for inkjet textile printing. A total solid content of less than 10% by mass may tends to deteriorate the printing density of the matter printed on the fabric. A total solid content exceeding 35% by mass may tends to deteriorate the discharge stability.

The non-white ink composition for inkjet textile printing may contain various additives such as viscosity modifiers, anti foaming agents, and film formation auxiliaries if necessary.

The viscosity of the non-white ink composition for inkjet textile printing is desirably 2 to 20 mPa·s. The surface tension of the non-white ink composition for inkjet textile printing is desirably 25 to 45 mN/m.

The non-white ink composition for inkjet textile printing may be produced with the materials by a conventional method. Examples of the method include a method in which a non-white ink composition for inkjet textile printing is produced by the steps of: mixing a non-white pigment, a polymeric dispersant, a surfactant, and an aqueous medium (and if necessary, a viscosity modifier, an antifoaming agent, and the like agents); dispersing the resultant mixture with any disperser and stirrer (for example, a bead mill, a ball mill, a sand mill, an attritor, a roll mill, an agitator, a Henschel mixer, a colloid mill, an ultrasonic homogenizer, an ultra-high pressure homogenizer, and a pearl mill); adding the other materials such as resin emulsions to the dispersed mixture; and mixing the entire mixture.

Next, the method for inkjet textile printing will be specifically described based on the preferable embodiment. Examples of the preferable embodiment of the method for inkjet textile printing include the methods (1) and (2).

The method (1) comprises the steps of: providing a treatment solution for inkjet textile printing on a fabric; heating the fabric; printing a white ink composition for inkjet textile printing on the fabric with a head for inkjet recording corresponding to a recording signal to form a white image; if necessary, printing a non-white ink composition for inkjet textile printing on the white image corresponding to a recording signal; and heating the fabric to fix the image.

The method (2) comprises the steps of: providing a treatment solution for inkjet textile printing on a fabric; heating the fabric; printing corresponding to a image signal with a head for inkjet recording using a non-white ink composition for inkjet textile printing; and heating to fix an image.

Examples of the method for providing the treatment solution for inkjet textile printing on a fabric include a method including immersing a fabric in a treatment solution; and a method including applying the treatment solution to the entire surface or a portion of a fabric (printing areas of an inkjet ink) with any coater. The main object of heating the fabric with the treatment solution provided thereon is to dry the fabric. The heating condition is not particularly limited, and heating may be performed at about 100 to 180° C. An amount of the treatment solution is suitably in the range of 10 to 200 g/m$^2$ in weight after drying. An amount less than the range tends not to sufficiently improve the degree of whiteness nor washing fastness. The amount exceeding the range tends to impair the drape.

An inkjet printer may be a known inkjet printer. The heating and fixing after the formation of images is performed, for example, by heating the fabric at a temperature of about 100 to 180° C. for about 30 to 120 seconds and fixing the image to the fabric. The heating of the fabric may be performed with any known heating means such as an iron, a dryer, and a drying machine.

Effects of the Invention

The treatment solution for inkjet textile printing according to the present invention causes few remaining marks even after provided on a fabric. The following two method for inkjet textile printing give a high image density (degree of whiteness, clear coloring) and provide a dyed product excellent in the coating film durability and washing fastness after printing, without impairing the drape of a fabric. One of the methods for inkjet textile printing includes providing the treatment solution for inkjet textile printing on a colored fabric without discharging coloring matter on the fabric; printing a white ink composition for inkjet textile printing on a printing region with a treatment solution provided thereon; and if necessary, printing a non-white ink composition for inkjet textile printing to the printing region. The other method for inkjet textile printing includes providing the treatment solution for inkjet textile printing on a fabric; and printing the non-white ink composition for inkjet textile printing on a printing region with a treatment solution provided thereon.

BEST MODE FOR CARRYING OUT THE INVENTION

Hereinafter, the present invention will be described in further detail with reference to the following examples. The present invention is not limited to these examples. Hereinafter, "%" and "part(s)" refer to "% by mass" and "part(s) by mass", respectively unless otherwise specified.

<Characteristic Values of Titanium Dioxide>
(Average Primary Particle Diameter)

The average primary particle diameter was measured with an image analysis device based on a transmission electron micrograph.

(Oil Absorption)

The oil absorption was measured in conformity with JIS K5010.

<Preparation of Treatment Solution for Inkjet Textile Printing in Examples>

(Treatment Solution 1 for Inkjet Textile Printing)

10 parts of calcium nitrate tetrahydrate, 6.0 parts of a nonionic styrene-acrylic self-crosslinkable resin emulsion (tradename: Mowinyl 966A, produced by Nichigo-Mowinyl Co., Ltd., solid content: 45%) having a glass transition temperature of −30° C., and 0.3 parts of Acetylenol E100 (HLB value: 13.5, ethylene oxide adduct of acetylene glycol, produced by Kawaken Fine Chemicals Co., Ltd.) were added to 83.7 parts of water and stirred to give a treatment solution 1 for inkjet textile printing.

(Treatment Solution 2 for Inkjet Textile Printing)

5 parts of calcium chloride, 6.0 parts of a nonionic styrene-acrylic self-crosslinkable resin emulsion (trade name: Mowinyl 966A, produced by Nichigo-Mowinyl Co., Ltd., solid content: 45%) having a glass transition temperature of −30° C., and 0.3 parts of Acetylenol E100 (HLB value: 13.5, ethylene oxide adduct of acetylene glycol, produced by Kawaken Fine Chemicals Co., Ltd.) were added to 88.7 parts of water and stirred to give a treatment solution 2 for inkjet textile printing.

(Treatment Solution 3 for Inkjet Textile Printing)

10 parts of calcium nitrate tetrahydrate, 6.0 parts of a nonionic styrene-acrylic self-crosslinkable resin emulsion (trade name: Mowinyl 966A, produced by Nichigo-Mowinyl Co., Ltd., solid content: 45%) having a glass transition temperature of −30° C., and 0.3 parts of a polyoxyethylene alkyl ether (HLB value: 14.5, trade name: Sanonic SS-120, produced by Sanyo Chemical Industries, Ltd.) were added to 83.7 parts of water and stirred to give a treatment solution 3 for inkjet textile printing.

(Treatment Solution 4 for Inkjet Textile Printing)

4 parts of calcium nitrate tetrahydrate, 6.0 parts of a nonionic styrene-acrylic self-crosslinkable resin emulsion (trade name: Mowinyl 966A, produced by Nichigo-Mowinyl Co, Ltd., solid content: 45%) having a glass transition temperature of −30° C., and 0.3 parts of Acetylenol E100 (HLB value: 13.5, ethylene oxide adduct of acetylene glycol, produced by Kawaken Fine Chemicals Co., Ltd.) were added to 89.7 parts of water and stirred to give a treatment solution 4 for inkjet textile printing.

(Treatment Solution 5 for Inkjet Textile Printing)

20 parts of calcium nitrate tetrahydrate, 6.0 parts of a nonionic styrene-acrylic self-crosslinkable resin emulsion (trade name: Mowinyl 966A, produced by Nichigo-Mowinyl Co., Ltd., solid content: 45%) having a glass transition temperature of −30° C., and 0.3 parts of Acetylenol E100 (HLB value: 13.5, ethylene oxide adduct of acetylene glycol, produced by Kawaken Fine Chemicals Co., Ltd.) were added to 73.7 parts of water and stirred to give a treatment solution 5 for inkjet textile printing.

(Treatment Solution 6 for Inkjet Textile Printing)

10 parts of calcium nitrate tetrahydrate, 0.7 parts of a nonionic styrene-acrylic self-crosslinkable resin emulsion (tradename: Mowinyl 966A, produced by Nichigo-Mowinyl Co., Ltd., solid content: 45%) having a glass transition temperature of −30° C., and 0.3 parts of Acetylenol E100 (HLB value: 13.5, ethylene oxide adduct of acetylene glycol, produced by Kawaken Fine Chemicals Co., Ltd.) were added to 89.0 parts of water and stirred to give a treatment solution 6 for inkjet textile printing.

(Treatment Solution 7 for Inkjet Textile Printing)

10 parts of calcium nitrate tetrahydrate, 11.0 parts of a nonionic styrene-acrylic self-crosslinkable resin emulsion (tradename: Mowinyl 966A, produced by Nichigo-Mowinyl Co., Ltd., solid content: 45%) having a glass transition temperature of −30° C., and 0.3 parts of Acetylenol E100 (HLB value: 13.5, ethylene oxide adduct of acetylene glycol, produced by Kawaken Fine Chemicals Co., Ltd.) were added to 78.7 parts of water and stirred to give a treatment solution 7 for inkjet textile printing.

(Treatment Solution 8 for Inkjet Textile Printing)

10 parts of calcium nitrate tetrahydrate, 6.0 parts of a nonionic styrene-acrylic self-crosslinkable resin emulsion (trade name: Mowinyl 966A, produced by Nichigo-Mowinyl Co., Ltd., solid content: 45%) having a glass transition temperature of −30° C., and 0.1 parts of Acetylenol E100 (HLB value: 13.5, ethylene oxide adduct of acetylene glycol, produced by Kawaken Fine Chemicals Co., Ltd.) were added to 83.9 parts of water and stirred to give a treatment solution 8 for inkjet textile printing.

(Treatment Solution 9 for Inkjet Textile Printing)

10 parts of calcium nitrate tetrahydrate, 6.0 parts of a nonionic styrene-acrylic self-crosslinkable resin emulsion (trade name: Mowinyl 966A, produced by Nichigo-Mowinyl Co., Ltd., solid content: 45%) having a glass transition temperature of −30° C., and 1.0 part of Acetylenol E100 (HLB value: 13.5, ethylene oxide adduct of acetylene glycol, produced by Kawaken Fine Chemicals Co., Ltd.) were added to 83.0 parts of water and stirred to give a treatment solution 9 for inkjet textile printing.

(Treatment Solution 10 for Inkjet Textile Printing)

10 parts of calcium nitrate tetrahydrate, 6.0 parts of a nonionic acrylic self-crosslinkable resin emulsion (trade name: Mowinyl 731, produced by Nichigo-Mowinyl Co., Ltd., solid content: 46% by mass) having a glass transition temperature of 0° C., and 0.3 parts of Acetylenol E100 (HLB value: 13.5, ethylene oxide adduct of acetylene glycol, produced by Kawaken Fine Chemicals Co., Ltd.) were added to 83.7 parts of water and stirred to give a treatment solution 10 for inkjet textile printing.

(Treatment Solution 11 for Inkjet Textile Printing)

10 parts of calcium nitrate tetrahydrate, 6.0 parts of an anionic acrylic self-crosslinkable resin emulsion (trade name: Mowinyl 952B, produced by Nichigo-Mowinyl Co., Ltd., solid content: 46% by mass) having a glass transition temperature of −38° C., and 0.3 parts of Acetylenol E100 (HLB value: 13.5, ethylene oxide adduct of acetylene glycol, produced by Kawaken Fine Chemicals Co., Ltd.) were added to 83.7 parts of water and stirred to give a treatment solution 11 for inkjet textile printing.

(Treatment Solution 12 for Inkjet Textile Printing)

10 parts of calcium nitrate tetrahydrate, 0.7 parts of an anionic acrylic self-crosslinkable resin emulsion (trade name: Mowinyl 952B, produced by Nichigo-Mowinyl Co., Ltd., solid content: 46% by mass) having a glass transition temperature of −38° C., and 0.3 parts of Acetylenol E100 (HLB value: 13.5, ethylene oxide adduct of acetylene glycol, produced by Kawaken Fine Chemicals Co., Ltd.) were added to 89.0 parts of water and stirred to give a treatment solution 12 for inkjet textile printing.

(Treatment Solution 13 for Inkjet Textile Printing)

10 parts of calcium nitrate tetrahydrate, 11.0 parts of an anionic acrylic self-crosslinkable resin emulsion (trade name: Mowinyl 952B, produced by Nichigo-Mowinyl Co., Ltd., solid content: 46% by mass) having a glass transition temperature of −38° C., and 0.3 parts of Acetylenol E100 (HLB value: 13.5, ethylene oxide adduct of acetylene glycol, produced by Kawaken Fine Chemicals Co., Ltd.) were added to 78.7 parts of water and stirred to give a treatment solution 13 for inkjet textile printing.

(Treatment Solution 14 for Inkjet Textile Printing)

10 parts of calcium nitrate tetrahydrate, 6.0 parts of an anionic acrylic self-crosslinkable resin emulsion (trade name: Mowinyl 718A, produced by Nichigo-Mowinyl Co., Ltd., solid content: 45% by mass) having a glass transition temperature of −6° C., and 0.3 parts of Acetylenol E100 (HLB value: 13.5, ethylene oxide adduct of acetylene glycol, produced by Kawaken Fine Chemicals Co., Ltd.) were added to 83.7 parts of water and stirred to give a treatment solution 14 for inkjet textile printing.

(Treatment Solution 15 for Inkjet Textile Printing)

10 parts of calcium nitrate tetrahydrate, 0.5 parts of carboxymethyl cellulose (trade name: CMC Daicel, produced by Daicel Chemical Industries, Ltd.), and 0.3 parts of Acetylenol E100 (HLB value: 13.5, ethylene oxide adduct of acetylene glycol, produced by Kawaken Fine Chemicals Co., Ltd.) were added to 89.2 parts of water and stirred to give a treatment solution 15 for inkjet textile printing.

(Treatment Solution 16 for Inkjet Textile Printing)

10 parts of calcium nitrate tetrahydrate, 0.1 parts of carboxymethyl cellulose (trade name: CMC Daicel, produced by Daicel Chemical Industries, Ltd.), and 0.3 parts of Acetylenol E100 (HLB value: 13.5, ethylene oxide adduct of acetylene glycol, produced by Kawaken Fine Chemicals Co., Ltd.) were added to 89.6 parts of water and stirred to give a treatment solution 16 for inkjet textile printing.

(Treatment Solution 17 for Inkjet Textile Printing)

10 parts of calcium nitrate tetrahydrate, 1.0 part of carboxymethyl cellulose (trade name: CMC Daicel, produced by Daicel Chemical Industries, Ltd.), and 0.3 parts of Acetylenol E100 (HLB value: 13.5, ethylene oxide adduct of acetylene glycol, produced by Kawaken Fine Chemicals Co., Ltd.) were added to 88.7 parts of water and stirred to give a treatment solution 17 for inkjet textile printing.

(Treatment Solution 18 for Inkjet Textile Printing)

10 parts of calcium nitrate tetrahydrate, 6.0 parts of a nonionic styrene-acrylic self-crosslinkable resin emulsion (tradename: Mowinyl 966A, produced by Nichigo-Mowinyl Co., Ltd., solid content: 45%) having a glass transition temperature of −30° C., and 0.3 parts of a polyoxyethylene alkyl ether sodium sulfate (Sandet END, produced by Sanyo Chemical Industries, Ltd.) were added to 83.7 parts of water and stirred to give a treatment solution 18 for inkjet textile printing.

(Treatment Solution 19 for Inkjet Textile Printing)

10 parts of calcium nitrate tetrahydrate, 6.0 parts of a nonionic styrene-acrylic self-crosslinkable resin emulsion (tradename: Mowinyl 966A, produced by Nichigo-Mowinyl Co, Ltd., solid content: 45%) having a glass transition temperature of −30° C., and 0.3 parts of 2-ethyl-N-carboxymethyl-N-hydroxyethylimidaliniumbetaine (Rebon 105, produced by Sanyo Chemical Industries, Ltd.) were added to 83.7 parts of water and stirred to give a treatment solution 19 for inkjet textile printing.

<Preparation of Treatment Solution for Inkjet Textile Printing in Comparative Examples>

(Treatment Solution 20 for Inkjet Textile Printing)

5 parts of calcium chloride was added to 95 parts of water and stirred to give a treatment solution 20 for inkjet textile printing.

(Treatment Solution 21 for Inkjet Textile Printing)

10 parts of calcium nitrate tetrahydrate, and 6.0 parts of a nonionic styrene-acrylic self-crosslinkable resin emulsion (trade name: Mowinyl 966A, produced by Nichigo-Mowinyl Co, Ltd., solid content: 45%) having a glass transition temperature of −30° C. were added to 84.0 parts of water and stirred to give a treatment solution 21 for inkjet textile printing.

(Treatment Solution 22 for Inkjet Textile Printing)

10 parts of calcium nitrate tetrahydrate, and 6.0 parts of an anionic acrylic self-crosslinkable resin emulsion (trade name: Mowinyl 952B, produced by Nichigo-Mowinyl Co., Ltd., solid content: 46% by mass) having a glass transition temperature of −38° C. were added to 84.0 parts of water and stirred to give a treatment solution 22 for inkjet textile printing.

(Treatment Solution 23 for Inkjet Textile Printing)

10 parts of calcium nitrate tetrahydrate, and 0.5 parts of carboxymethyl cellulose (trade name: CMC Daicel, produced by Daicel Chemical Industries, Ltd.) were added to 89.5 parts of water and stirred to give a treatment solution 23 for inkjet textile printing.

<Preparation of White Ink Composition for Inkjet Textile Printing and Blue Ink Composition for Inkjet Textile Printing>

[Preparation of Polymeric Dispersant Solution]

(Preparation of Polymeric Dispersant Solution 1)

25 parts of a solid acrylic acid/n-butyl acrylate/benzyl methacrylate/styrene copolymer having a glass transition temperature of 40° C., a weight-average molecular weight of 10000, and an acid value of 150 mg KOH/g was dissolved in a mixed solution of 3.2 parts of sodium hydroxide and 71.8 parts of water to give a polymeric dispersant solution 1 having a solid content of 25%.

(Preparation of Polymeric Dispersant Solution 2)

25 parts of a solid acrylic acid/n-butyl acrylate/benzyl methacrylate/styrene copolymer having a glass transition temperature of 60° C., a weight-average molecular weight of 10000, and an acid value of 150 mg KOH/g was dissolved in a mixed solution of 3.2 parts of sodium hydroxide and 71.8 parts of water to give a polymeric dispersant solution 2 having a solid content of 25%.

[Preparation of Ink Base for Inkjet Textile Printing]
(Preparation of White Ink Base for Inkjet Textile Printing)

19 parts of water was added to 36 parts of the polymeric dispersant solution 1 and mixed to prepare a resin varnish for dispersing titanium oxide. 45 parts of titanium oxide (CR-90, treated with alumina silica, average primary particle diameter: 0.25 µm, oil absorption: 21 ml/100 g, produced by Ishihara Sangyo Kaisya Ltd.) was added thereto and stirred to give a mixture. Thereafter, the mixture was milled with a wet circulation mill to give a white ink base for inkjet textile printing.

(Preparation of Water-Based Blue Ink Base for Inkjet Textile Printing)

64 parts by mass of water was added to 16 parts by mass of the polymeric dispersant solution 2 and mixed to prepare a resin varnish for dispersing blue pigment. 20 parts by mass of blue pigment (PB15:3, LIONOL BLUE FG-7330, produced by Toyo Ink Mfg. Co., Ltd.) was added thereto and stirred to give a mixture. Thereafter, the mixture was milled with a wet circulation mill to give a water-based blue ink base for inkjet textile printing.

(Preparation of Water-Based Yellow Ink Base for Inkjet Textile Printing)

64 parts by mass of water was added to 16 parts by mass of the polymeric dispersant solution 2 and mixed to prepare a resin varnish for dispersing blue pigment. 20 parts by mass of yellow pigment (PY74, Brilliant Yellow 5GX, produced by Clariant) was added thereto and stirred to give a mixture. Thereafter, the mixture was milled with a wet circulation mill to give a water-based yellow ink base for inkjet textile printing.

(Preparation of Water-Based Red Ink Base for Inkjet Textile Printing)

64 parts by mass of water was added to 16 parts by mass of the polymeric dispersant solution 2 and mixed to prepare a resin varnish for dispersing blue pigment. 20 parts by mass of red pigment (PR122, CROMOPHTAL PINK PT, produced by Ciba Specialty Chemicals) was added thereto and stirred to give a mixture. Thereafter, the mixture was milled with a wet circulation mill to give a water-based red ink base for inkjet textile printing.

(Preparation of Water-Based Black Ink Base for Inkjet Textile Printing)

64 parts by mass of water was added to 16 parts by mass of the polymeric dispersant solution 2 and mixed to prepare a resin varnish for dispersing blue pigment. 20 parts by mass of black pigment (PBk7 MA100, produced by Mitsubishi Chemical Corporation) was added thereto and stirred to give a mixture. Thereafter, the mixture was milled with a wet circulation mill to give a water-based black ink base for inkjet textile printing.

(White Ink Composition 1 for Inkjet Textile Printing)

33.3 parts of a nonionic styrene-acrylic self-crosslinkable resin emulsion (trade name: Mowinyl 966A, produced by Nichigo-Mowinyl Co., Ltd., solid content: 45%) having a glass transition temperature of −30° C., 20 parts of glycerin, 1 part of Acetylenol E100 (ethylene oxide adduct of acetylene glycol, produced by Kawaken Fine Chemicals Co., Ltd.), and 12.4 parts of water were added to 33.3 parts of the white ink base for inkjet textile printing, and stirred to give a white ink composition 1 for inkjet textile printing.

(White Ink Composition 2 for Inkjet Textile Printing)

33.3 parts of an anionic acrylic self-crosslinkable resin emulsion (trade name: Mowinyl 952B, produced by Nichigo-Mowinyl Co., Ltd., solid content: 46% by mass) having a glass transition temperature of −38° C., 20 parts of glycerin, 1 part of Acetylenol E100 (ethylene oxide adduct of acetylene glycol, produced by Kawaken Fine Chemicals Co., Ltd.), and 12.4 parts of water were added to 33.3 parts of the white ink base for inkjet textile printing, and stirred to give a white ink composition 2 for inkjet textile printing.

(Blue Ink Composition 1 for Inkjet Textile Printing)

35 parts by mass of a nonionic styrene-acrylic self-crosslinkable resin emulsion (trade name: Mowinyl 966A, produced by Nichigo-Mowinyl Co., Ltd., solid content: 45% by mass) having a glass transition temperature of −30° C., 20 parts by mass of glycerin, 1 part by mass of Acetylenol E100 (ethylene oxide adduct of acetylene glycol, produced by Kawaken Fine Chemicals Co., Ltd.), and 26.5 parts by mass of water were added to 17.5 parts by mass of the water-based blue ink base for inkjet textile printing, and stirred to give a water-based blue ink composition 1 for inkjet textile printing.

(Blue Ink Composition 2 for Inkjet Textile Printing)

35 parts by mass of an anionic acrylic self-crosslinkable resin emulsion (trade name: Mowinyl 952B, produced by Nichigo-Mowinyl Co., Ltd., solid content: 46% by mass) having a glass transition temperature of −38° C., 20 parts by mass of glycerin, 1 part by mass of Acetylenol E100 (ethylene oxide adduct of acetylene glycol, produced by Kawaken Fine Chemicals Co., Ltd.), and 26.5 parts by mass of water were added to 17.5 parts by mass of the water-based blue ink base for inkjet textile printing, and stirred to give a water-based blue ink composition 2 for inkjet textile printing.

(Yellow Ink Composition 1 for Inkjet Textile Printing)

30 parts by mass of a nonionic styrene-acrylic self-crosslinkable resin emulsion (trade name: Mowinyl 966A, produced by Nichigo-Mowinyl Co., Ltd., solid content: 45% by mass) having a glass transition temperature of −30° C., 30 parts by mass of glycerin, 1 part by mass of Acetylenol E100 (ethylene oxide adduct of acetylene glycol, produced by Kawaken Fine Chemicals Co., Ltd.), and 24 parts by mass of water were added to 15 parts by mass of the water-based yellow ink base for inkjet textile printing, and stirred to give a water-based yellow ink composition 1 for inkjet textile printing.

(Yellow Ink Composition 2 for Inkjet Textile Printing)

35 parts by mass of an anionic acrylic self-crosslinkable resin emulsion (trade name: Mowinyl 952B, produced by Nichigo-Mowinyl Co., Ltd., solid content: 46% by mass) having a glass transition temperature of −38° C., 30 parts by mass of glycerin, 1 part by mass of Acetylenol E100 (ethylene oxide adduct of acetylene glycol, produced by Kawaken Fine Chemicals Co., Ltd.), and 24 parts by mass of water were added to 15 parts by mass of the water-based yellow ink base for inkjet textile printing, and stirred to give a water-based yellow ink composition 2 for inkjet textile printing.

(Red Ink Composition 1 for Inkjet Textile Printing)

40 parts by mass of a nonionic styrene-acrylic self-crosslinkable resin emulsion (trade name: Mowinyl 966A, produced by Nichigo-Mowinyl Co., Ltd., solid content: 45% by mass) having a glass transition temperature of −30° C., 20 parts by mass of glycerin, 1 part by mass of Acetylenol E100 (ethylene oxide adduct of acetylene glycol, produced by Kawaken Fine Chemicals Co., Ltd.), and 19 parts by mass of water were added to 20 parts by mass of the water-based red ink base for inkjet textile printing, and stirred to give a water-based red ink composition 1 for inkjet textile printing.

(Red Ink Composition 2 for Inkjet Textile Printing)

40 parts by mass of an anionic acrylic self-crosslinkable resin emulsion (trade name: Mowinyl 952B, produced by Nichigo-Mowinyl Co., Ltd., solid content: 46% by mass) having a glass transition temperature of −38° C., 20 parts by mass of glycerin, 1 part by mass of Acetylenol E100 (ethylene oxide adduct of acetylene glycol, produced by Kawaken Fine Chemicals Co., Ltd.), and 19 parts by mass of water were added to 20 parts by mass of the water-based red ink base for inkjet textile printing, and stirred to give a water-based red ink composition 2 for inkjet textile printing.

(Black Ink Composition 1 for Inkjet Textile Printing)

46.7 parts by mass of a nonionic styrene-acrylic self-crosslinkable resin emulsion (trade name: Mowinyl 966A, produced by Nichigo-Mowinyl Co., Ltd., solid content: 45% by mass) having a glass transition temperature of −30° C., 20 parts by mass of glycerin, 1 part by mass of Acetylenol E100 (ethylene oxide adduct of acetylene glycol, produced by Kawaken Fine Chemicals Co., Ltd.), and 23 parts by mass of water were added to 30 parts by mass of the water-based black ink base for inkjet textile printing, and stirred to give a water-based black ink composition 1 for inkjet textile printing.

(Black Ink Composition 2 for Inkjet Textile Printing)

46.7 parts by mass of an anionic acrylic self-crosslinkable resin emulsion (trade name: Mowinyl 952B, produced by Nichigo-Mowinyl Co., Ltd., solid content: 46% by mass) having a glass transition temperature of −38° C., 20 parts of glycerin, 1 part by mass of Acetylenol E100 (ethylene oxide adduct of acetylene glycol, produced by Kawaken Fine Chemicals Co., Ltd.), and 23 parts by mass of water were added to 30 parts by mass of the water-based black ink base for inkjet textile printing, and stirred to give a water-based black ink composition 2 for inkjet textile printing.

<Printing of Water-Based White Ink Composition for Inkjet Textile Printing>

100%-cotton black fabrics were impregnated with the treatment solutions 1 to 23 in an amount of 10 g per A4 paper size of the fabrics and then dried by heat. Subsequently, a water-based white ink composition 1 or 2 for inkjet textile printing was printed four times on each of the fabrics with a printer for evaluation equipped with a head produced by SPECTRA, Inc. in such a manner that all of the solid-printed parts overlap with one another. Thereafter, the printed part was heated with a heat pressing machine for 30 seconds at a temperature of 180° C. Thereby, a water-based white ink composition for inkjet textile printing was fixed to the fabric, and textile printed products of Examples 1 to 33 and Comparative Examples 1 to 4 were produced.

<Printing of Water-Based Blue Ink Composition for Inkjet Textile Printing>

100%-cotton white fabrics were impregnated with the treatment solutions 1, 3, 10, 11, 14, and 21 in an amount of 10 g per A4 paper size of the fabrics and then dried by heat. Subsequently, a water-based blue ink composition 1 or 2 for inkjet textile printing was solid-printed with a printer for evaluation equipped with a head produced by SPECTRA, Inc. Thereafter, the printed part was heated with a heat pressing machine for 30 seconds at a temperature of 180° C. Thereby, a water-based blue ink composition for inkjet textile printing was fixed to the fabric, and textile printed products of Examples 34 to 43 and Comparative Examples 5 and 6 were produced.

<Printing of Water-Based Yellow Ink Composition for Inkjet Textile Printing>

100%-cotton white fabrics were impregnated with the treatment solutions 1 and 21 in an amount of 10 g per A4 paper size of the fabrics and then dried by heat. Subsequently, a water-based yellow ink composition 1 or 2 for inkjet textile printing was solid-printed with a printer for evaluation equipped with a head produced by SPECTRA, Inc. Thereafter, the printed part was heated with a heat pressing machine for 30 seconds at a temperature of 180° C. Thereby, a water-based yellow ink composition for inkjet textile printing was fixed to a fabric, and textile printed products of Examples 44 and 45 and Comparative Examples 7 and 8 were produced.

<Printing of Water-Based Red Ink Composition for Inkjet Textile Printing>

100%-cotton white fabrics were impregnated with the treatment solutions 1 and 21 in an amount of 10 g per A4 paper size of the fabrics and then dried by heat. Subsequently, a water-based red ink composition 1 or 2 for inkjet textile printing was solid-printed with a printer for evaluation equipped with a head produced by SPECTRA, Inc. Thereafter, the printed part was heated with a heat pressing machine for 30 seconds at a temperature of 180° C. Thereby, a water-based red ink composition for inkjet textile printing was fixed to the fabric, textile printed products of Examples 46 and 47 and Comparative Examples 9 and 10 were produced.

<Printing of Water-Based Black Ink Composition for Inkjet Textile Printing>

100%-cotton white fabrics were impregnated with the treatment solutions 1 and 21 in an amount of 10 g per A4 paper size of the fabrics and then dried by heat. Subsequently, a water-based black ink composition 1 or 2 for inkjet textile printing was solid-printed with a printer for evaluation equipped with a head produced by SPECTRA, Inc. Thereafter, the printed part was heated with a heat pressing machine for 30 seconds at a temperature of 180° C. Thereby, a water-based black ink composition for inkjet textile printing was fixed to the fabric, and textile printed products of Examples 48 and 49 and Comparative Examples 11 and 12 were produced.

<White Dyed Product>

(Image Density)

Lightness (L*) of each of the textile printed products in Examples 1 to 33 and Comparative Examples 1 to 4 was measured with a color-difference meter (produced by Konica Minolta Holdings, Inc., product number: DR-321). Tables 1 and 2 show the results.

+++: L* is 80 or higher.
++: L* is 70 or higher and lower than 80.
+: L* is 50 or higher and lower than 70.
−: L* is lower than 50.

(Coating Film Durability)

Each of the textile printed products in Examples 1 to 33 and Comparative Examples 1 to 4 was stretched five times (to the very limit of stretching), and the stretched product was visually evaluated for cracking and peeling of the coating film. Tables 1 and 2 show the results.

+++: Cracking and peeling of the coating film were not observed.
++: Peeling of the coating film was not observed, but slight cracking thereof was observed.
+: Peeling of the coating film was not observed, but cracking thereof was observed.
−: Cracking and peeling of the coating film were observed.

(Washing Fastness)

Each of the textile printed products in Examples 1 to 33 and Comparative Examples 1 to 4 was washed with a household washing machine five times (washing condition: common mode washing, dehydration, and then drying). The lightness of each textile printed product before and after washing was measured with a color-difference meter (produced by Konica Minolta Holdings, Inc., product number: DR-321), and the rate of change in the lightness (L*) from the initial value measured before washing was determined and evaluated. Tables 1 and 2 show the results.

+++: The image density was 90% or higher of the initial value after washing.

++: The image density was 80% or higher and lower than 90% of the initial value after washing.

+: The image density was 70% or higher and lower than 80% of the initial value after washing.

−: The image density was lower than 70% of the initial value after washing.

(Drape)

Each of the textile printed products of Examples 1 to 33 and Comparative Examples 1 to 4 was touched by hand and evaluated. Tables 1 and 2 show the results.

+++: The textile printed product was easily folded and nearly as soft as a 100%-cotton black fabric itself.

++: The textile printed product was easily folded but slightly rougher than a fabric.

+: The textile printed product was rough.

−: The textile printed product was so hard that it was not folded freely.

(Remaining Marks of Treatment Solution)

Each of the textile printed products of Examples 1 to 33 and Comparative Examples 1 to 4 was evaluated for remaining marks of the treatment solution based on the following criteria. Tables 1 and 2 show the results.

+++: No remaining marks derived from the treatment solution were observed in non-printed areas on the treatment solution-coated surface of the textile printed product.

++: Minor remaining marks derived from the treatment solution were observed in non-printed areas on the treatment solution-coated surface of the textile printed product but not remarkable.

+: Remaining marks derived from the treatment solution were observed in non-printed areas on the treatment solution-coated surface of the textile printed product.

−: Remarkable remaining marks derived from the treatment solution were observed in non-printed areas on the treatment solution-coated surface of the textile printed product.

<Non-White Dyed Product>

(Image Density)

The image density (OD value) of the solid parts of each of the textile printed products in Examples 34 to 49 and Comparative Examples 5 to 12 was evaluated with a Macbeth density meter (produced by Macbeth, product number: TD-931). Tables 3 and 4 show the results.

(Coating Film Durability)

Each of the textile printed products in Examples 34 to 49 and Comparative Examples 5 to 12 was stretched five times (to the very limit of stretching), and the stretched product was visually evaluated for cracking and peeling of the coating film. Tables 3 and 4 show the results.

+++: Cracking and peeling of the coating film were not observed.

++: Peeling of the coating film was not observed, but slight cracking thereof was observed.

+: Peeling of the coating film was not observed, but cracking thereof was observed.

−: Cracking and peeling of the coating film were observed.

(Washing Fastness)

Each of the textile printed products of Examples 34 to 49 and Comparative Examples 5 to 12 was washed with a household washing machine five times (washing condition: common mode washing, dehydration, and then drying). The image density (OD value) of each textile printed product before and after washing was measured with a Macbeth density meter (produced by Macbeth, product number: TD-931), and the rate of change in the image density from the initial value measured before washing was determined and evaluated. Tables 3 and 4 show the results.

+++: The image density was 90% or higher of the initial value after washing.

++: The image density was 80% or higher and lower than 90% of the initial value after washing.

+: The image density was 70% or higher and lower than 80% of the initial value after washing.

−: The image density was lower than 70% of the initial value after washing.

(Drape)

Each of the textile printed product of Examples 34 to 49 and Comparative Examples 5 to 12 was touched by hand and evaluated. Tables 3 and 4 show the results.

+++: The textile printed product was easily folded and nearly as soft as a 100%-cotton black fabric itself.

++: The textile printed product was easily folded but slightly rougher than a fabric.

+: The textile printed product was rough.

−: The textile printed product was so hard that it was not folded freely.

(Remaining Marks of Treatment Solution)

Each of the textile printed products of Examples 34 to 49 and Comparative Examples 5 to 12 was evaluated for remaining marks of the treatment solution based on the following criteria. Tables 3 and 4 show the results.

+++: No remaining marks derived from the treatment solution were observed in non-printed areas on the treatment solution-coated surface of the textile printed product.

++: Minor remaining marks derived from the treatment solution were observed in non-printed areas on the treatment solution-coated surface of the textile printed product but not remarkable.

+: Remaining marks derived from the treatment solution were observed in non-printed areas on the treatment solution-coated surface of the textile printed product.

−: Remarkable remaining marks derived from the treatment solution were observed in non-printed areas on the treatment solution-coated surface of the textile printed product.

TABLE 1-1

| | Example 1 | Example 2 | Example 3 | Example 4 | Example 5 | Example 6 | Example 7 | Example 8 | Example 9 |
|---|---|---|---|---|---|---|---|---|---|
| Treatment solution | 1 | 1 | 2 | 2 | 3 | 3 | 4 | 4 | 5 |
| White ink composition for inkjet textile printing | 1 | 2 | 1 | 2 | 1 | 2 | 1 | 2 | 1 |
| Treatment solution | 1 | 1 | 2 | 2 | 3 | 3 | 4 | 4 | 5 |
| Polyvalent metal salt | $Ca(NO_3)_2$ | $Ca(NO_3)_2$ | $CaCl_2$ | $CaCl_2$ | $Ca(NO_3)_2$ | $Ca(NO_3)_2$ | $Ca(NO_3)_2$ | $Ca(NO_3)_2$ | $Ca(NO_3)_2$ |
| Amount of polyvalent metal salt | 10 | 10 | 5 | 5 | 10 | 10 | 4 | 4 | 20 |
| Resin component | Em | Em | Em | Em | Em | Em | Em | Em | Em |
| Amount of resin component | 2.7 | 2.7 | 2.7 | 2.7 | 2.7 | 2.7 | 2.7 | 2.7 | 2.7 |
| Emulsion | Nonion | Nonion | Nonion | Nonion | Nonion | Nonion | Nonion | Nonion | Nonion |

TABLE 1-1-continued

|  | Example 1 | Example 2 | Example 3 | Example 4 | Example 5 | Example 6 | Example 7 | Example 8 | Example 9 |
|---|---|---|---|---|---|---|---|---|---|
| Tg of emulsion (° C.) | −30 | −30 | −30 | −30 | −30 | −30 | −30 | −30 | −30 |
| Nonionic surfactant | Acetylene | Acetylene | Acetylene | Acetylene | Polyoxy | Polyoxy | Acetylene | Acetylene | Acetylene |
| HLB value | 13.5 | 13.5 | 13.5 | 13.5 | 14.5 | 14.5 | 13.5 | 13.5 | 13.5 |
| Amount of nonionic surfactant | 0.3 | 0.3 | 0.3 | 0.3 | 0.3 | 0.3 | 0.3 | 0.3 | 0.3 |
| White ink composition | 1 | 2 | 1 | 2 | 1 | 2 | 1 | 2 | 1 |
| Emulsion | Nonion | Anion | Nonion | Anion | Nonion | Anion | Nonion | Anion | Nonion |
| Lightness (L*) | +++(87) | +++(87) | +++(88) | +++(87) | +++(86) | +++(86) | +++(82) | +++(81) | +++(88) |
| Coating film durability | +++ | +++ | +++ | +++ | +++ | +++ | +++ | +++ | +++ |
| Washing fastness | +++ | +++ | +++ | +++ | +++ | +++ | +++ | +++ | +++ |
| Drape | +++ | +++ | +++ | +++ | +++ | +++ | +++ | +++ | ++ |
| Remaining marks of treatment solution | +++ | +++ | ++ | ++ | +++ | +++ | +++ | +++ | +++ |

TABLE 1-2

|  | Example 10 | Example 11 | Example 12 | Example 13 | Example 14 | Example 15 | Example 16 | Example 17 | Example 18 |
|---|---|---|---|---|---|---|---|---|---|
| Treatment solution | 5 | 6 | 6 | 7 | 7 | 8 | 8 | 9 | 9 |
| White ink composition for inkjet textile printing | 2 | 1 | 2 | 1 | 2 | 1 | 2 | 1 | 2 |
| Treatment solution | 5 | 6 | 6 | 7 | 7 | 8 | 8 | 9 | 9 |
| Polyvalent metal salt | Ca(NO$_3$)$_2$ | Ca(NO$_3$)$_2$ | Ca(NO$_3$)$_2$ | Ca(NO$_3$)$_2$ | Ca(NO$_3$)$_2$ | Ca(NO$_3$)$_2$ | Ca(NO$_3$)$_2$ | Ca(NO$_3$)$_2$ | Ca(NO$_3$)$_2$ |
| Amount of polyvalent metal salt | 20 | 10 | 10 | 10 | 10 | 10 | 10 | 10 | 10 |
| Resin component | Em | Em | Em | Em | Em | Em | Em | Em | Em |
| Amount of resin component | 2.7 | 0.3 | 0.3 | 5 | 5 | 2.7 | 2.7 | 2.7 | 2.7 |
| Emulsion | Nonion | Nonion | Nonion | Nonion | Nonion | Nonion | Nonion | Nonion | Nonion |
| Tg of emulsion (° C.) | −30 | −30 | −30 | −30 | −30 | −30 | −30 | −30 | −30 |
| Nonionic surfactant | Acetylene | Acetylene | Acetylene | Acetylene | Acetylene | Acetylene | Acetylene | Acetylene | Acetylene |
| HLB value | 13.5 | 13.5 | 13.5 | 13.5 | 13.5 | 13.5 | 13.5 | 13.5 | 13.5 |
| Amount of nonionic surfactant | 0.3 | 0.3 | 0.3 | 0.3 | 0.3 | 0.1 | 0.1 | 1 | 1 |
| White ink composition | 2 | 1 | 2 | 1 | 2 | 1 | 2 | 1 | 2 |
| Emulsion | Anion | Nonion | Anion | Nonion | Anion | Nonion | Anion | Nonion | Anion |
| Lightness (L*) | +++(88) | +++(84) | +++(84) | +++(88) | +++(88) | +++(87) | +++(87) | +++(87) | +++(86) |
| Coating film durability | +++ | +++ | +++ | +++ | +++ | +++ | +++ | +++ | +++ |
| Washing fastness | +++ | +++ | +++ | +++ | +++ | +++ | +++ | +++ | +++ |
| Drape | ++ | +++ | +++ | +++ | +++ | +++ | +++ | +++ | +++ |
| Remaining marks of treatment solution | +++ | +++ | +++ | ++ | ++ | +++ | +++ | +++ | +++ |

TABLE 2-1

|  | Example 19 | Example 20 | Example 21 | Example 22 | Example 23 | Example 24 | Example 25 | Example 26 |
|---|---|---|---|---|---|---|---|---|
| Treatment solution | 10 | 10 | 11 | 11 | 12 | 12 | 13 | 13 |
| White ink composition for inkjet textile printing | 1 | 2 | 1 | 2 | 1 | 2 | 1 | 2 |
| Treatment solution | 10 | 10 | 11 | 11 | 12 | 12 | 13 | 13 |
| Polyvalent metal salt | Ca(NO$_3$)$_2$ | Ca(NO$_3$)$_2$ | Ca(NO$_3$)$_2$ | Ca(NO$_3$)$_2$ | Ca(NO$_3$)$_2$ | Ca(NO$_3$)$_2$ | Ca(NO$_3$)$_2$ | Ca(NO$_3$)$_2$ |
| Amount of polyvalent metal salt | 10 | 10 | 10 | 10 | 10 | 10 | 10 | 10 |
| Resin component | Em | Em | Em | Em | Em | Em | Em | Em |
| Amount of resin component | 2.8 | 2.8 | 2.8 | 2.8 | 0.3 | 0.3 | 5.1 | 5.1 |
| Emulsion | Nonion | Nonion | Anion | Anion | Anion | Anion | Anion | Anion |
| Tg of emulsion (° C.) | 0 | 0 | −38 | −38 | −38 | −38 | −38 | −38 |
| Nonionic surfactant | Acetylene | Acetylene | Acetylene | Acetylene | Acetylene | Acetylene | Acetylene | Acetylene |
| HLB value | 13.5 | 13.5 | 13.5 | 13.5 | 13.5 | 13.5 | 13.5 | 13.5 |
| Amount of nonionic surfactant | 0.3 | 0.3 | 0.3 | 0.3 | 0.3 | 0.3 | 0.3 | 0.3 |
| White ink composition | 1 | 2 | 1 | 2 | 1 | 2 | 1 | 2 |
| Emulsion | Nonion | Anion | Nonion | Anion | Nonion | Anion | Nonion | Anion |
| Lightness (L*) | +++(84) | +++(85) | +++(88) | +++(87) | +++(83) | +++(84) | +++(87) | +++(87) |
| Coating film durability | +++ | +++ | +++ | +++ | +++ | +++ | +++ | +++ |
| Washing fastness | +++ | +++ | +++ | +++ | +++ | +++ | +++ | +++ |
| Drape | +++ | +++ | +++ | +++ | +++ | +++ | +++ | +++ |
| Remaining marks of treatment solution | +++ | +++ | +++ | +++ | +++ | +++ | ++ | ++ |

TABLE 2-1-continued

|  | Example 27 | Example 28 | Example 29 | Example 30 | Example 31 | Example 32 | Example 33 |
|---|---|---|---|---|---|---|---|
| Treatment solution | 14 | 14 | 15 | 16 | 17 | 18 | 19 |
| White ink composition for inkjet textile printing | 1 | 2 | 1 | 1 | 1 | 2 | 2 |
| Treatment solution | 14 | 14 | 15 | 16 | 17 | 18 | 19 |
| Polyvalent metal salt | $Ca(NO_3)_2$ | $Ca(NO_3)_2$ | $Ca(NO_3)_2$ | $Ca(NO_3)_2$ | $Ca(NO_3)_2$ | $Ca(NO_3)_2$ | $Ca(NO_3)_2$ |
| Amount of polyvalent metal salt | 10 | 10 | 10 | 10 | 10 | 10 | 10 |
| Resin component | Em | Em | CMC | CMC | CMC | Em | Em |
| Amount of resin component | 2.7 | 2.7 | 0.5 | 0.1 | 1 | 2.7 | 2.7 |
| Emulsion | Anion | Anion | None | None | None | Nonion | Nonion |
| Tg of emulsion (° C.) | −6 | −6 | None | None | None | −30 | −30 |
| Nonionic surfactant | Acetylene | Acetylene | Acetylene | Acetylene | Acetylene | Anion | Ampholytic |
| HLB value | 13.5 | 13.5 | 13.5 | 13.5 | 13.5 | None | None |
| Amount of nonionic surfactant | 0.3 | 0.3 | 0.3 | 0.3 | 0.3 | 0.3 | 0.3 |
| White ink composition | 1 | 2 | 1 | 1 | 1 | 2 | 2 |
| Emulsion | Nonion | Anion | Nonion | Nonion | Nonion | Anion | Anion |
| Lightness (L*) | +++(84) | +++(85) | +++(83) | +++(82) | +++(85) | 86 | 87 |
| Coating film durability | +++ | +++ | +++ | +++ | +++ | +++ | +++ |
| Washing fastness | +++ | +++ | +++ | +++ | +++ | +++ | +++ |
| Drape | +++ | +++ | +++ | +++ | ++ | +++ | +++ |
| Remaining marks of treatment solution | +++ | +++ | +++ | +++ | +++ | +++ | +++ |

TABLE 2-2

|  | Comparative Example 1 | Comparative Example 2 | Comparative Example 3 | Comparative Example 4 |
|---|---|---|---|---|
| Treatment solution | 20 | 21 | 22 | 23 |
| White ink composition for inkjet textile printing | 1 | 1 | 1 | 1 |
| Treatment solution | 20 | 21 | 22 | 23 |
| Polyvalent metal salt | $CaCl_2$ | $Ca(NO_3)_2$ | $Ca(NO_3)_2$ | $Ca(NO_3)_2$ |
| Amount of polyvalent metal salt | 5 | 10 | 10 | 10 |
| Resin component | None | Em | Em | CMC |
| Amount of resin component | None | 2.7 | 2.8 | 0.5 |
| Emulsion | None | Nonion | Anion | None |
| Tg of emulsion (° C.) | None | −30 | −38 | None |
| Nonionic surfactant | None | None | None | None |
| HLB value | None | None | None | None |
| Amount of nonionic surfactant | None | None | None | None |
| White ink composition | 1 | 1 | 1 | 1 |
| Emulsion | Nonion | Nonion | Nonion | Nonion |
| Lightness (L*) | ++(79) | +++(86) | +++(87) | +++(83) |
| Coating film durability | +++ | +++ | +++ | +++ |
| Washing fastness | + | +++ | +++ | +++ |
| Drape | +++ | +++ | +++ | +++ |
| Remaining marks of treatment solution | + | + | + | + |

TABLE 3-1

|  | Example 34 | Example 35 | Example 36 | Example 37 | Example 38 | Example 39 | Example 40 |
|---|---|---|---|---|---|---|---|
| Treatment solution | 1 | 1 | 3 | 3 | 10 | 10 | 11 |
| Treatment solution | Blue 1 | Blue 2 | Blue 1 | Blue 2 | Blue 1 | Blue 2 | Blue 1 |
| Polyvalent metal salt | $Ca(NO_3)_2$ | $Ca(NO_3)_2$ | $Ca(NO_3)_2$ | $Ca(NO_3)_2$ | $Ca(NO_3)_2$ | $Ca(NO_3)_2$ | $Ca(NO_3)_2$ |
| Amount of polyvalent metal salt | 10 | 10 | 10 | 10 | 10 | 10 | 10 |
| Resin component | Em | Em | Em | Em | Em | Em | Em |
| Amount of resin component | 2.7 | 2.7 | 2.7 | 2.7 | 2.7 | 2.7 | 2.8 |
| Emulsion | Nonion | Nonion | Nonion | Nonion | Nonion | Nonion | Anion |
| Tg of emulsion (° C.) | −30 | −30 | −30 | −30 | 0 | 0 | −38 |
| Nonionic surfactant | Acetylene | Acetylene | Polyoxy | Polyoxy | Acetylene | Acetylene | Acetylene |
| HLB value | 13.5 | 13.5 | 14.5 | 14.5 | 13.5 | 13.5 | 13.5 |
| Amount of nonionic surfactant | 0.3 | 0.3 | 0.3 | 0.3 | 0.3 | 0.3 | 0.3 |
| Non-white ink composition | Blue 1 | Blue 2 | Blue 1 | Blue 2 | Blue 1 | Blue 2 | Blue 1 |
| Emulsion | Nonion | Anion | Nonion | Anion | Nonion | Anion | Nonion |
| Image density (OD value) | 1.36 | 1.36 | 1.34 | 1.33 | 1.29 | 1.31 | 1.39 |

TABLE 3-1-continued

|  | | | | | | | |
|---|---|---|---|---|---|---|---|
| Coating film durability | +++ | +++ | +++ | +++ | +++ | +++ | +++ |
| Washing fastness | +++ | +++ | +++ | +++ | +++ | +++ | +++ |
| Drape | +++ | +++ | +++ | +++ | +++ | +++ | +++ |
| Remaining marks of treatment solution | +++ | +++ | +++ | +++ | +++ | +++ | +++ |

|  | Example 41 | Example 42 | Example 43 | Comparative Example 5 | Comparative Example 6 |
|---|---|---|---|---|---|
| Treatment solution | 11 | 14 | 14 | 19 | 19 |
| Treatment solution | Blue 2 | Blue 1 | Blue 2 | Blue 1 | Blue 2 |
| Polyvalent metal salt | $Ca(NO_3)_2$ | $Ca(NO_3)_2$ | $Ca(NO_3)_2$ | $Ca(NO_3)_2$ | $Ca(NO_3)_2$ |
| Amount of polyvalent metal salt | 10 | 10 | 10 | 10 | 10 |
| Resin component | Em | Em | Em | Em | Em |
| Amount of resin component | 2.8 | 2.7 | 2.7 | 2.7 | 2.7 |
| Emulsion | Anion | Anion | Anion | Nonion | Nonion |
| Tg of emulsion (° C.) | −38 | −6 | −6 | −30 | −30 |
| Nonionic surfactant | Acetylene | Acetylene | Acetylene | None | None |
| HLB value | 13.5 | 13.5 | 13.5 | None | None |
| Amount of nonionic surfactant | 0.3 | 0.3 | 0.3 | None | None |
| Non-white ink composition | Blue 2 | Blue 1 | Blue 2 | Blue 1 | Blue 2 |
| Emulsion | Anion | Nonion | Anion | Nonion | Anion |
| Image density (OD value) | 1.37 | 1.32 | 1.33 | 1.34 | 1.36 |
| Coating film durability | +++ | +++ | +++ | +++ | +++ |
| Washing fastness | +++ | +++ | +++ | +++ | +++ |
| Drape | +++ | +++ | +++ | +++ | +++ |
| Remaining marks of treatment solution | +++ | +++ | +++ | + | + |

TABLE 3-2

|  | Example 44 | Example 45 | Comparative Example 7 | Comparative Example 8 |
|---|---|---|---|---|
| Treatment solution | 1 | 1 | 19 | 19 |
| Treatment solution | Yellow 1 | Yellow 2 | Yellow 1 | Yellow 2 |
| Polyvalent metal salt | $Ca(NO_3)_2$ | $Ca(NO_3)_2$ | $Ca(NO_3)_2$ | $Ca(NO_3)_2$ |
| Amount of polyvalent metal salt | 10 | 10 | 10 | 10 |
| Resin component | Em | Em | Em | Em |
| Amount of resin component | 2.7 | 2.7 | 2.7 | 2.7 |
| Emulsion | Nonion | Nonion | Nonion | Nonion |
| Tg of emulsion (° C.) | −30 | −30 | −30 | −30 |
| Nonionic surfactant | Acetylene | Acetylene | None | None |
| HLB value | 13.5 | 13.5 | None | None |
| Amount of nonionic surfactant | 0.3 | 0.3 | None | None |
| Non-white ink composition | Yellow 1 | Yellow 2 | Yellow 1 | Yellow 2 |
| Emulsion | Nonion | Anion | Nonion | Anion |
| Image density (OD value) | 1.28 | 1.31 | 1.26 | 1.29 |
| Coating film durability | +++ | +++ | +++ | +++ |
| Washing fastness | +++ | +++ | +++ | +++ |
| Drape | +++ | +++ | +++ | +++ |
| Remaining marks of treatment solution | +++ | +++ | + | + |

TABLE 4

|  | Example 46 | Example 47 | Comparative Example 9 | Comparative Example 10 | Example 48 | Example 49 | Comparative Example 11 | Comparative Example 12 |
|---|---|---|---|---|---|---|---|---|
| Treatment solution | 1 | 1 | 19 | 19 | 1 | 1 | 19 | 19 |
| Treatment solution | Red 1 | Red 2 | Red 1 | Red 2 | Black 1 | Black 2 | Black 1 | Black 2 |
| Polyvalent metal salt | $Ca(NO_3)_2$ | $Ca(NO_3)_2$ | $Ca(NO_3)_2$ | $Ca(NO_3)_2$ | $Ca(NO_3)_2$ | $Ca(NO_3)_2$ | $Ca(NO_3)_2$ | $Ca(NO_3)_2$ |
| Amount of polyvalent metal salt | 10 | 10 | 10 | 10 | 10 | 10 | 10 | 10 |
| Resin component | Em | Em | Em | Em | Em | Em | Em | Em |
| Amount of resin component | 2.7 | 2.7 | 2.7 | 2.7 | 2.7 | 2.7 | 2.7 | 2.7 |
| Emulsion | Nonion | Nonion | Nonion | Nonion | Nonion | Nonion | Nonion | Nonion |
| Tg of emulsion (° C.) | −30 | −30 | −30 | −30 | −30 | −30 | −30 | −30 |
| Nonionic surfactant | Acetylene | Acetylene | None | None | Acetylene | Acetylene | None | None |
| HLB value | 13.5 | 13.5 | None | None | 13.5 | 13.5 | None | None |

TABLE 4-continued

| | Example 46 | Example 47 | Comparative Example 9 | Comparative Example 10 | Example 48 | Example 49 | Comparative Example 11 | Comparative Example 12 |
|---|---|---|---|---|---|---|---|---|
| Amount of nonionic surfactant | 0.3 | 0.3 | None | None | 0.3 | 0.3 | None | None |
| Non-white ink composition | Red 1 | Red 2 | Red 1 | Red 2 | Black 1 | Black 2 | Black 1 | Black 2 |
| Emulsion | Nonion | Anion | Nonion | Anion | Nonion | Anion | Nonion | Anion |
| Image density (OD value) | 1.35 | 1.32 | 1.33 | 1.29 | 1.36 | 1.35 | 1.35 | 1.33 |
| Coating film durability | +++ | +++ | +++ | +++ | +++ | +++ | +++ | +++ |
| Washing fastness | +++ | +++ | +++ | +++ | +++ | +++ | +++ | +++ |
| Drape | +++ | +++ | +++ | +++ | +++ | +++ | +++ | +++ |
| Remaining marks of treatment solution | +++ | +++ | + | + | +++ | +++ | + | + |

Treatment with a treatment solution for printing according to the present invention and subsequent printing by inkjet prevented remaining marks of the treatment solution, and simultaneously provided the textile printed product excellent in image density, coating film durability, washing fastness, and drape. On the other hand, in the case that neither a nonionic surfactant nor a resin component was used, remaining marks of the treatment solution occurred and washing fastness was inferior in some cases.

<Printing of Blue Ink Composition for Inkjet Textile Printing after Printing of White Ink Composition for Inkjet Textile Printing>

100%-cotton black fabrics were impregnated with the treatment solution 1 or 20 in an amount of 10 g per A4 paper size of the fabrics and then dried by heat. Subsequently, a water-based white ink composition 1 for inkjet textile printing was printed four times on each of the fabrics with a printer for evaluation equipped with a head produced by SPECTRA, Inc. in such a manner that all of the solid-printed parts overlap with one another. Subsequently, a blue ink composition for inkjet textile printing was solid-printed in the solid printing areas. Thereafter, the printed part was heated with a heat pressing machine for 30 seconds at a temperature of 180° C. Thereby, textile printed products on which a white ink composition for inkjet textile printing and a blue ink composition for inkjet textile printing were fixed to a fabric were provided.

The textile printed product obtained by using the treatment solution 1 had no remaining mark of the treatment solution on the fabric, and the drape of the colored fabric was not impaired. The textile printed product was superior in coating film durability, washing fastness, and clearness of the image printed thereon. The textile printed product obtained by using the treatment solution 20 had remaining marks, the drape of the colored fabric was poor, and the clearness of the image printed thereon was inferior.

INDUSTRIAL APPLICABILITY

The treatment solution for inkjet textile printing and the method for inkjet textile printing according to the present invention are suitably applicable to a method for textile printing a fabric.

The invention claimed is:

1. A treatment solution for inkjet textile printing, comprising at least:
   1) a water-soluble polyvalent metal salt;
   2) at least one resin component selected from the group consisting of a nonionic resin emulsion, an anionic resin emulsion, and a carboxymethyl cellulose;
   3) at least one surfactant component selected from the group consisting of a nonionic surfactant, an anionic surfactant, and an amphoteric surfactant; and
   4) an aqueous medium,
   wherein said treatment solution is suitable for being applied to a fabric before printing of an ink composition for inkjet textile printing, and
   wherein the treatment solution satisfies the following formula (1):

$$0.1 \leq (A/3 + B/3 + C) \leq 1.7 \tag{1}$$

where A represents a solid content of the nonionic resin emulsion in parts by mass, B represents a solid content of the anionic resin emulsion in parts by mass, and C represents a solid content of the carboxymethyl cellulose in parts by mass, in 100 parts by mass of the treatment solution, and each of A, B, and C may be 0 parts by mass as long as the condition of formula (1) is satisfied.

2. The treatment solution for inkjet textile printing according to claim 1, wherein said water-soluble polyvalent metal salt is a calcium salt.

3. The treatment solution for inkjet textile printing according to claim 2, wherein said calcium salt has hygroscopicity.

4. The treatment solution for inkjet textile printing according to claim 1,
   wherein the amount of said surfactant component is 0.1 to 1.5% by mass in said treatment solution for inkjet textile printing.

5. The treatment solution for inkjet textile printing according to claim 1,
   wherein said nonionic surfactant has an HLB value of 13 or higher.

6. A method for inkjet textile printing, comprising the steps of:
   providing the treatment solution for inkjet textile printing according to claim 1 in at least a printing region for inkjet ink on a fabric;
   heating the fabric with the treatment solution provided thereon;
   printing, on the region with the treatment solution provided thereon, the following ink compositions (1) and/or (2):
   (1) a white ink composition for inkjet textile printing comprising a white pigment, a polymeric dispersant obtainable by neutralizing an anionic water-soluble resin with a basic compound, a nonionic resin emulsion having a glass transition temperature of 20° C. or lower and/or an anionic resin emulsion having a glass transition temperature of 0° C. or lower, and an aqueous medium;
   (2) a non-white ink composition for inkjet textile printing comprising a non-white pigment, a polymeric dispersant obtainable by neutralizing an anionic water-soluble resin with a basic compound, a nonionic resin emulsion having a glass transition temperature of 0° C. or lower and/or an anionic resin emulsion having a glass transition temperature of 0° C. or lower, and an aqueous medium; and
   heating the printed fabric.

7. The method for inkjet textile printing according to claim 6,
wherein the step of printing the white ink composition for inkjet textile printing is followed by the step of printing a non-white ink composition for inkjet textile printing.

8. An inkjet textile printed product obtainable by the method for inkjet textile printing according to claim 6.

* * * * *